United States Patent Office 3,393,852
Patented July 23, 1968

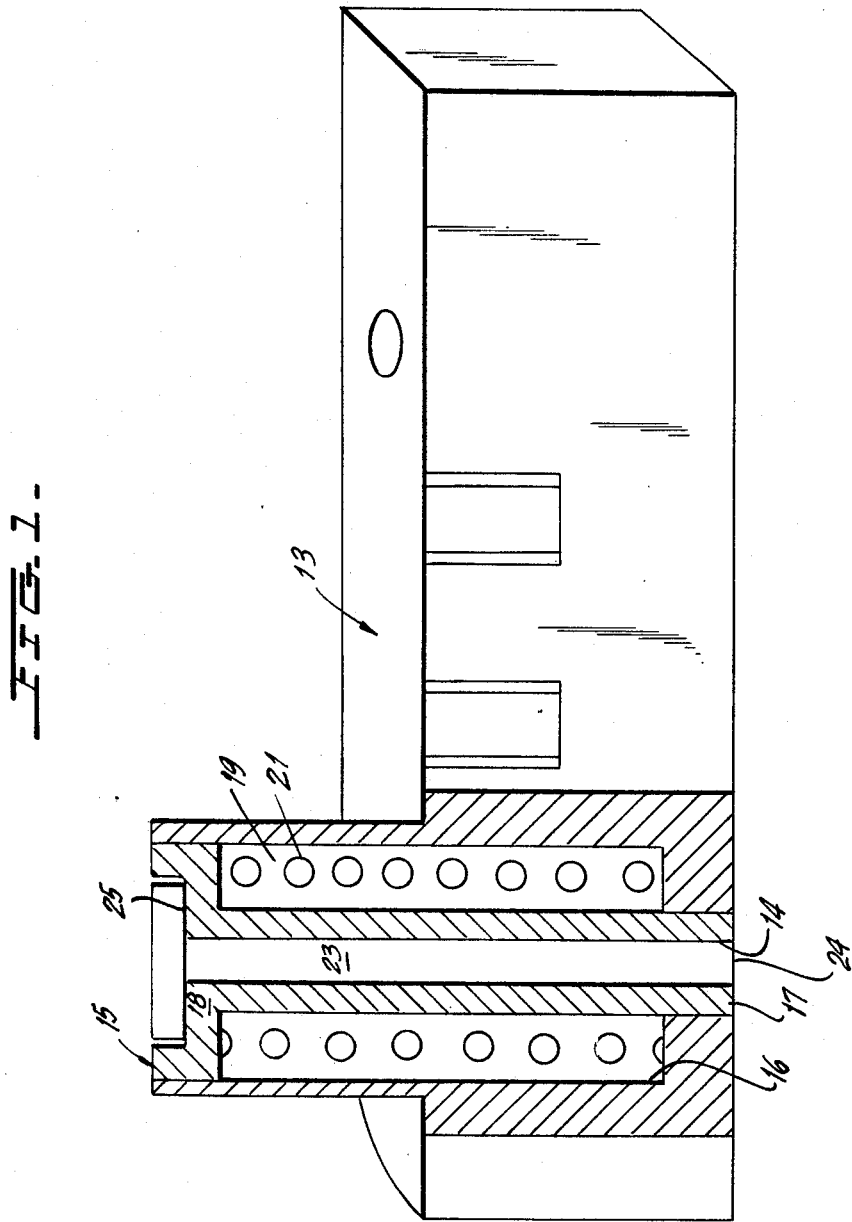

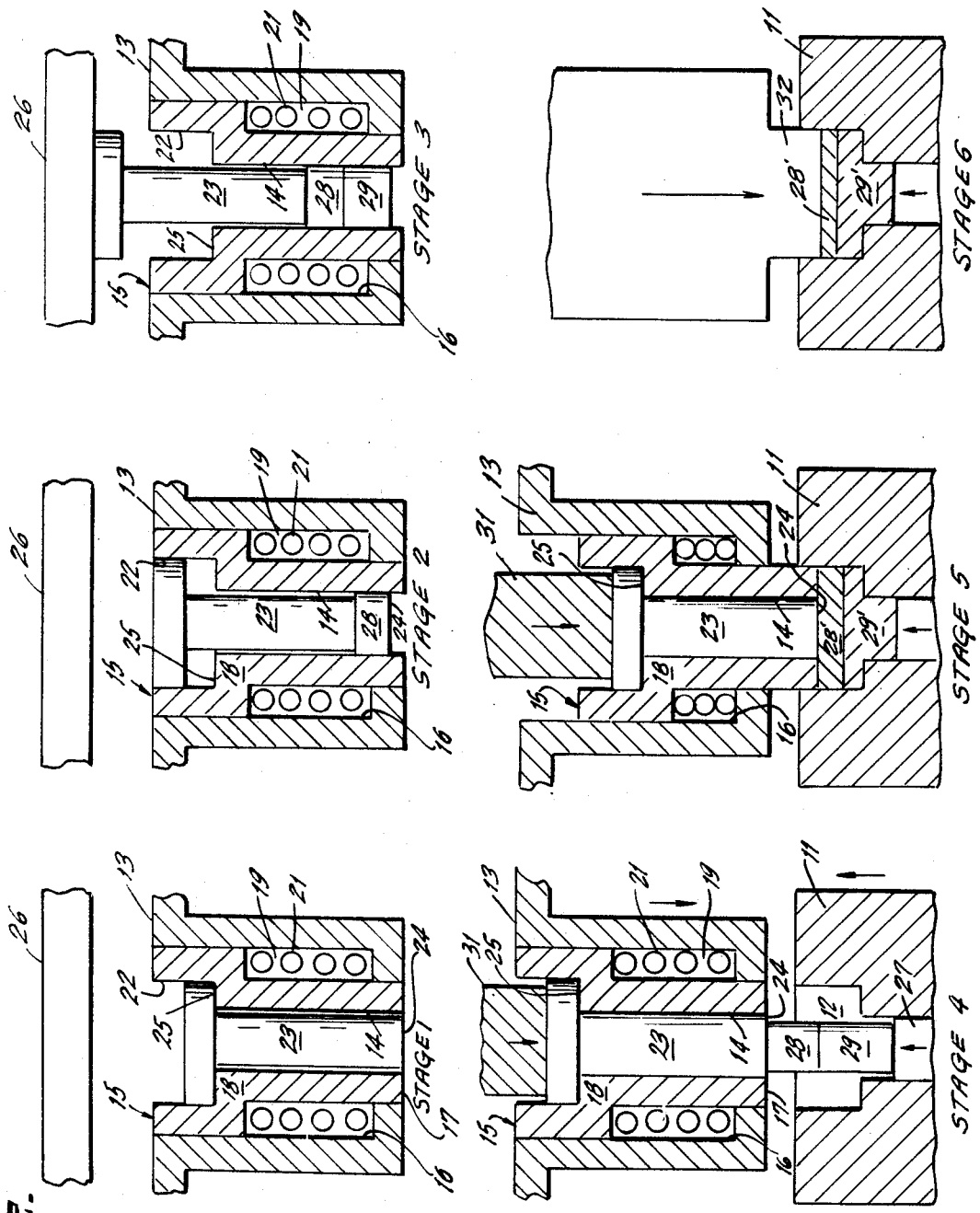

3,393,852
APPARATUS FOR FORMING COMPOSITE
ELECTRICAL CONTACTS
Herbert C. Graves, Jr., Greensburg, Pa., assignor to
Talon, Inc., Meadville, Pa., a corporation of
Pennsylvania
Filed Oct. 23, 1965, Ser. No. 503,746
3 Claims. (Cl. 228—3)

ABSTRACT OF THE DISCLOSURE

A cutter bar to be used in a header assembly for forming composite contact elements is provided with a bore for receiving segments of wire and a pin for compressing the wire into a forming die. The bore is defined by a movable shell which cooperates with the pin and the forming die to compress the metal segments into a composite contact element.

---

This invention relates to an improved apparatus for forming composite electrical contact elements. More particularly, the invention relates to such an apparatus which is designed to effect the formation of composite contacts having substantially uniform thicknesses.

In copending application Ser. No. 431,310 filed on Feb. 9, 1965, and owned by the assignee of the present invention, an apparatus for forming composite electrical contact elements is described. Such apparatus comprises a header assembly including a feed die disposed on one side of a shear plane and having a pair of longitudinally extending feed passages terminating in openings adjacent such plane. The first of the passages in the feed die is provided for feeding a first wire stock material for forming the working face portion of each of the composite contact elements, and the second of such passages is provided for feeding a second wire stock material for forming the body portion of each such element. Disposed on the same side of the shear plane, spaced from the feed die, is a forming or heading die having an enlarged recess for receiving successive wire segments separated from the wire stock materials. The recess, in which mutual upsetting and bonding of such segments is effected, has an internal diameter at least 1.5 times the internal diameters of each of the feed die passages.

A cutter bar having an internal bore extending transversely therethrough is pivotally mounted adjacent the shear plane opposite from the feed and heading dies, such that an opening at one end of the bore abutting the shear plane describes an arc, upon pivoting the cutter bar, between a first position in alignment with a first of the feed passages in the feed die, a second position in alignment with the second of the feed passages in such die, and a third position in alignment with the recess in the heading die. Shear means is also associated with either the feed die or the cutter bar for shearing the wire segments fed through the passages in the feed die into the cutter bar bore, upon pivoting the cutter bar between its several positions. Forming elements are associated with the cutter bar and heading die, respectively, for imparting a plurality of forming blows to the pairs of wire segments fed through the cutter bar bore into the recess of the heading die, to thereby effect upsetting and bonding of such segments within the recess. Finally, the apparatus described in the aforesaid copending application additionally includes means for ejecting each of the composite elements formed from the heading die recess to facilitate the formation of further composite elements.

The pair of forming elements thus employed to effect bonding of the metallic segments include a hammer pin designed to force such segments into the heading die recess, axially thereof, and a concave-shaped punch, which applies compressive force annularly of the abutting segments, to shape the same into the desired composite contact element. Such elements act through the stationary bore extending transversely of and through one end of the cutter bar body.

It is among the objects of the present invention to provide an improved apparatus of the general character described above, which may be utilized to form composite contact elements having substantially uniform thicknesses and improved shear strengths.

Other objects and advantages of the invention will be apparent from a consideration of the following description thereof, when taken in connection with the annexed drawings, in which:

FIGURE 1 is a partially schematic cross-section through the cutter bar of a preferred form of the improved apparatus of the present invention; and FIGURE 2 is a schematic representation illustrating the successive stages of the formation of a composite contact element, employing such apparatus.

The apparatus hereof comprises the feed die illustrated, for example, in the aforesaid copending application, a heading die 11 having an enlarged recess 12 therein, and a pivotally mounted cutter bar 13. The cutter bar has a central bore 14 which is moveable, upon pivoting the cutter bar, between a pair of positions aligned with the corresponding feed passages in the feed die and a third position aligned with the recess 12 in the heading die 11.

In accordance with the present invention, the bore 14 is defined by an inner shell 15 slidably mounted in the bore for movement transversely of the cutter bar within an outer shell 16. The inner shell is generally T-shaped in cross-section, having a lower (or leading) compression surface 17 and an upper (or trailing) shoulder element 18 abutting the outer shell 16, and defining an annular chamber 19 intermediate the inner and outer shells. A compression spring 21 is disposed within the chamber 19, engaging the shoulder 18 and biasing the inner shell upwardly, viewing FIGURES 1 and 2.

A flange 22 is provided on shoulder 18, the flange and shoulder together defining a seat for a forming pin 23 which may be received within the bore 14 provided by the inner shell. The forming pin is designed to mate with the inner shell, having a T-shaped configuration and including a lower (or leading) compression surface 24 and an upper (or trailing) shoulder 25 which seats upon the flange and shoulder elements of the inner shell.

An adjustable stop 26 disposed on one side of bore 14, and a knock-out pin 27 disposed within the heading die 11 on the opposite side of the bore, may be utilized to determine the length of the forming stroke and compressive pressures produced by forming pin 23 and inner shell 15 on the aligned wire segments utilized in the formation of composite contact elements, as described more fully hereinafter. Mechanism for shearing the respective wire segments from stock materials and for ejecting the bonded composite elements from recess 12 in heading die 11 may additionally be provided as described more fully in the aforesaid copending application, the pertinent disclosure of which is incorporated herein by reference.

The successive stages in the formation of composite contact elements employing the header assembly of the invention are illustrated in FIGURE 2. As may be seen in Stage 1 thereof, forming pin 23 is normally seated on shoulder 18 and flange 22 of inner shell 15, with the inner shell maintained in its rest position by compression spring 21. When, as shown in Stage 2, a first wire segment 28 (constituted of a material like silver, for forming the contact working face portion of the composite element) is fed by the feed die into bore 14, the forming pin 23 is displaced rearwardly from its seat, reaching a rearward or retracted position (Stage 3) when a further wire segment 29 (constituted of a material like copper, for forming the contact body portion of the composite element) has been fed into bore 14. The respective segments are sheared from their stock materials by successively pivoting cutter bar 13, as described below.

The forward forming stroke of pin 23 is shown in Stages 4 and 5 of the drawings. A coining punch 31 (which may be conventionally actuated) forces forming pin 23 through the bore 14. The shoulder 25 of the forming pin is thereby seated on shoulder 18 of inner shell 15, forcing the same through the outer shell 16, against the force of compression spring 21. The compression surface 24 of the forming pin is thereby forced against the central, axial portions of the abutting wire segments 28 and 29, driving such segments through bore 14 and into recess 12 of the heading die. The abutting wire segments are thus forced against knock-out pin 27 in the heading die, the imposition of further pressure upon forming pin 23 effecting mutual upsetting of the abutting ends of the segments within recess 12.

As segments 28 and 29 are mushroomed into the expanded configuration shown at 28' and 29' (Stage 5), the leading surface 17 of inner shell 15 compresses the annular surfaces thereof, concurrently with the imposition of axial pressure by surface 24 of the forming pin. Both the forming pin and the inner moveable shell thus apply compressive forces during the first forming blow imparted to the wire segments, thereby imparting more uniform bonding pressures and improving the shear strengths of the composite elements thus formed. It has, moreover, been found that the annular forces imparted by the moveable inner shell of the apparatus hereof, produce contact elements having more uniform densities and thicknesses across the working surfaces thereof than attainable in composite contact elements previously produced.

The forming pin 23 and moveable shell 15 may thereafter be retracted and a further coining die or punch 32 (Stage 6) employed to impart a second forming blow to the bonded wire segments, the punch 32 entering recess 12 of the heading die to close the die and press the composite contact element into its desired final configuration. Knock-out pin 27 is thereafter utilized to eject the composite contact element from heading die 11 preparatory to repeating the forming cycle for the manufacture of additional composite elecetrical contact elements.

As described more fully in the aforesaid copending application, the operations described above are effected after successively pivoting the cutter bar into a plurality of predetermined positions. Initially, the cutter bar is disposed such that bore 14 is in alignment with a first of the feed passages in the feed die, in order that the contact working face segment 28 may be fed into the bore, as illustrated in Stage 2. The cutter bar is thereafter pivoted to a second position in which the bore is disposed in alignment with the second of the feed passages in the feed die, in order that the contact body segment 29 may be fed into the bore, as shown in Stage 3. The cutter bar is thereafter pivoted into a third position with the bore in alignment with recess 12 in the heading die 11, in order that forming pin 23 and inner shell 15 may carry out the first forming blow illustrated in Stages 4 and 5. Finally, when the cutter bar is pivoted out of the third position (e.g., back into the first position) the punch 32 is disposed in alignment with the heading die, to effect the second and final forming blow illustrated in Stage 6.

It will be noted that use of the improved apparatus of the present invention facilitates more uniform bonding of the constituent segments of composite electric contact elements and thus provides composite elements having markedly higher and more uniform shear strengths, as compared with those produced by previously known techniques.

It will be understood that various changes may be made in the preferred embodiment of the apparatus, described hereinabove, without departing from the scope of the present invention. Accordingly, it is intended that the preceding description should be interpreted as illustrative and not in a limiting sense.

What is claimed is:

1. In an apparatus for forming composite electric contact elements which comprises a die for feeding wire stock materials, a cutter bar for receiving segments of said wire stock materials from said feed die and a heading die having an enlarged recess for receiving said segments of said wire stock material from said cutter bar and for forming said wire segments into composite electrical contact elements, the improvement which comprises:

a cutter bar having a transverse bore extending therethrough for receiving said segments of wire stock material, said bore being defined by a movable inner shell;

a movable pin, within said inner shell for diplacing said wire segments from said bore to said heading die and for moving said inner shell toward said heading die thereby compressing the annular peripheries of said wire segments within the recess of said heading die.

2. The apparatus as set forth in claim 1 in which said movable pin has a shoulder resting on said inner shell for causing movement of said shell responsive to movement of said pin; and including elastic means biasing the inner shell lengthwise of said bore toward said pin for limiting the movement of said shell.

3. The apparatus as set forth in claim 2 in which said cutter bar further includes an aperture extending transversely therethrough adjacent one end thereof and thereby defining an outer shell; said inner shell mounted within said outer shell for movement longitudinally therethrough; said inner shell being spaced from said outer shell intermediate its ends and having a shouldered portion abutting said outer shell at the end closest to said heading die; a compression spring in the space between said inner and outer shells and biasing the shouldered portion of said inner shell away from said heading die.

References Cited

UNITED STATES PATENTS

| 3,279,505 | 10/1966 | Renz | 29—155.55 |
| 2,364,011 | 11/1944 | Wales | 78—52 |
| 2,603,987 | 7/1952 | Lyon | 72—354 |

RICHARD H. EANES, JR., *Primary Examiner.*